United States Patent [19]
Peters et al.

[11] 4,126,594
[45] Nov. 21, 1978

[54] METHOD OF PROTECTING PLASTIC FILMS AGAINST ABRASION AND LACQUER FOR PERFORMING THE METHOD

[75] Inventors: Victor Peters, Windach-Schöffelding; Franz Krammer, Friedberg, both of Fed. Rep. of Germany

[73] Assignee: Alkor GmbH Künststoffverkauf, Munich, Fed. Rep. of Germany

[21] Appl. No.: 741,758

[22] Filed: Nov. 15, 1976

[30] Foreign Application Priority Data

Nov. 27, 1975 [DE] Fed. Rep. of Germany ....... 2553354

[51] Int. Cl.$^2$ ............................................. C08L 61/28
[52] U.S. Cl. ....................... 260/29.4 UA; 260/28.5 R; 260/29.6 NR; 427/385 B; 427/391; 427/393; 428/436; 428/500; 428/515; 428/516
[58] Field of Search ....................... 260/29.4 UA, 856; 427/385, 385 B; 526/328, 317, 29.6 NR

[56] References Cited

U.S. PATENT DOCUMENTS

| | | | |
|---|---|---|---|
| 3,362,844 | 1/1968 | Christenson et al. | 526/328 |
| 3,813,262 | 5/1974 | Shelton et al. | 260/29.4 UA |
| 3,919,154 | 11/1975 | Chang | 260/29.4 UA |
| 3,996,177 | 12/1976 | Ludwig | 260/29.4 UA |

*Primary Examiner*—Theodore E. Pertilla
*Attorney, Agent, or Firm*—Hans Berman

[57] ABSTRACT

A lacquer consisting essentially of a uniform dispersion or solution of 8% to 16% polymerized lower alkyl acrylate and/or methacrylate having 1% to 20% free carboxyl groups, 2.5% to 10% polymethyl or polyethylmethacrylate, 5% to 10% water-soluable, thermosetting melamine resin, the balance being a volatile medium consisting essentially of water and a lower alkanol when deposited on a plastic film and cured at a temperature at least sufficient to volatilize the solvent, forms a transparent, abrasion-resistant coating.

14 Claims, No Drawings

METHOD OF PROTECTING PLASTIC FILMS AGAINST ABRASION AND LACQUER FOR PERFORMING THE METHOD

This invention relates to the protection of plastic films against abrasion, and particularly to a method of protecting the surface of a plastic film against abrasion, and to a lacquer suitable for forming a protecting coating on the plastic surface.

Sheet material of synthetic resin compositions including foils and thin plates, hereinafter jointly referred to as "plastic films", is often exposed to environmental conditions which mar its appearance and other desirable properties. It is known to coat exposed surfaces of plastic films with lacquers which improve their resistance to mechanical and chemical damage.

The known lacquers are based on PVC-copolymers, polyurethanes, polymethacrylates, polymers of isocyanates and polyesters, and the like, and require organic solvent systems which attack most plastic films. Particularly, the solvents diffuse into the plastic material and impair the strength of the films. The solvents can be removed from the plastic substrate only under conditions making it impractical to recover the volatile organic solvents which are discharged into the atmosphere. The solvent vapors constitute a fire hazard and pollute the air.

An important object of this invention is the provision of a protective lacquer for plastic films which does not attack the film surface to be protected and whose solvent medium may safely be discharged to the ambient air without presenting a significant fire or pollution hazard.

It has now been found that plastic films may be protected against abrasion and other damaging environmental factors by coating with a lacquer which is a dispersion, molecular or otherwise, of film-forming resins in an aqueous, alcoholic solvent system. A resin mixture capable of being applied in such a solvent system and of forming a practically transparent layer on the coated plastic film after evaporation of the solvent and curing essentially consists of acrylic homo- and copolymers having free carboxyl groups, polymethyl or polyethylmethacrylate, and a thermosetting, water-soluble melamine resin.

More specifically, the lacquer of the invention consists essentially, first, of 8% to 16% by weight of an acrylic polymer consisting essentially of repeating units of the formulas $C_2H_3COOR$ or $C_3H_6COOR$, wherein R is hydrogen, methyl, or ethyl, at least 1% and not more than 20% of R being hydrogen; second, 2.5% to 10% by weight of methyl or ethyl ester of polymethacrylic acid; third, 5% to 10% by weight of a water-soluble, thermosetting melamine resin; the balance being a volatile liquid medium consisting essentially of a mixture of water and an alkanol having up to three carbon atoms in which the polymer, the ester, and the resin are uniformly dispersed, that is, either dissolved or suspended in finely divided form.

After a surface of one of the many kinds of plastic sheets to which the liquid medium is inert has been coated with the lacquer, the lacquer is heated until the medium is substantially completely volatilized, and the polymer, the ester, and the resin jointly form a layer on the plastic surface which is at least substantially transparent.

The lacquer may contain a small amount of a strong acid catalyst of a type capable of accelerating the setting of the melamine resin at a temperature of approximately 150° C. such as 1.2 to 3.5 parts by weight of p-toluenesulfonic acid. The lacquer is preferably adjusted to a pH of 7.5 to 8.5 prior to application by means of ammonia or an amine. The preferred temperature for curing the lacquer is between 140° and 160° C. and necessary precautions may have to be taken to protect the underlying plastic sheet against overheating.

The cured lacquer layer adheres well to most plastic sheets and to conventional inks used for decorating the sheets so that it may be embossed without loss of adhesion or transparency. If the normal high gloss of the cured lacquer is undesirable, finely dispersed silicon dioxide, polyethylene wax, or polypropylene wax may be admixed in a conventional manner. The lacquer layer is sufficiently flexible for application to packaging foils of polyvinyl chloride, polyolefins, acrylics, polyurethane, and modified polyesters. It also adheres well to paper and even to glass. Striking visual effects are produced by embossing the lacquer film on a suitable substrate with a pattern of wood grain.

The rate at which the solvent medium evaporates from an applied layer of lacquer to leave a non-blocking residue is very high so as to permit plastic foils to be imprinted and thereafter coated with the lacquer of the invention in continuous operation at the highest speed at which the printing step can be performed. If so desired, the lacquer of the invention may be covered with an overlay of nitrocellulose lacquer of the type used in furniture manufacturing to match plastic sheets imprinted with a wood grain pattern and protected by the lacquer of this invention with lacquered wood veneers.

The carboxyl groups permit the first-mentioned polymer constituent of the lacquer to dissolve in the aqueous, alcoholic medium at a barely alkaline pH value, and the solubility varies with the number of free carboxyl groups and the alkalinity of the medium. At a pH of 7.5 or better 8.0, a clear solution in an azeotropic mixture of water and ethanol is readily prepared from a copolymer of methyl methacrylate and methyl acrylate in which at least 10% of the original carboxymethyl groups are saponified to the free carboxyl groups. At lower pH and at lower percentage of carboxyl groups, the acrylic polymer may not completely dissolve. But even at only 1% free carboxyl groups, the cured lacquer layer ultimately produced is adequately transparent for most applications in which the lacquer covers a decorative imprint. The mechanical strength and chemical resistance of the lacquer decreases with too high a percentage of carboxyl groups, and more than 50% carboxyl is not generally desirable.

The properties of the lacquer are less affected by other features of the repeating units. It is of relatively minor importance in which proportion units derived from acrylic acid and from methacrylic acid are present in the polymer, and it is immaterial whether alkyl in the carboxyalkyl groups is methyl or ethyl. Solubility generally increases with the alcohol content of the solvent medium which preferably contains at least 50% of one of the low-boiling alkanols having up to three carbon atoms.

In preparing the lacquer, the acrylic polymer carrying carboxyl groups is first dissolved in the aqueous alcohol in the presence of ammonia or a strongly alkaline, volatile amine, such as triethylamine. The methyl methacrylate is added next as a suspension, and an aqueous solution of the melamine resin follows. A small amount of an acid capable of accelerating the setting of the melamine resin may be added, but must be balanced by additions of ammonia or amine to maintain a pH at which the carboxyl bearing acrylic polymer remains in solution and condensation of the melamine resin with other ingredients is not impeded, if a more or less transparent, cured coating is desired.

The following examples further illustrate the invention. All parts and percentages referred to are by weight.

EXAMPLE 1

An acrylic copolymer of the afore-described type in which units derived from ethyl acrylate predominated and in which free carboxyl groups amounted to approximately 10% of the combined number of carboxyl, carboxymethyl and carboxyethyl groups was obtained as a commercial product in the form of a 40% solution in aqueous ethanol (Neocryl BT 20, manufactured by the Dutch firm of Polyvinylchemie). 25 Parts of the copolymer were dissolved in an azeotropic mixture of ethanol and water in the presence of 0.8 part aqueous, 25% ammonium hydroxide, 6 Parts polymethylmethacrylate were dispersed in the solution, and the lacquer was completed by adding 6 parts hexamethoxymethyl melamine, 1.2 parts p-toluenesulfonic acid, and enough of the azeotropic aqueous ethanol to bring the solvent to 25 parts.

Pliable polyvinyl chloride foil was imprinted with the lacquer on a photogravure machine, and the coating was cured 70 seconds at 140° C. by an air stream. The lacquer coating adhered firmly to the plastic foil. It was much more resistant to scratching than the surface of the substrate, was fully transparent, showed a high gloss and was non-blocking.

A coating of the same properties was obtained on the PVC foil when the same lacquer was applied by means of wiper coating machines, screen printing, brush spreader, floating knife coater, roll kiss coater, rubber spreader, doctor kiss coater, rotation screen printing or spraying after suitable viscosity adjustment with aqueous ethanol. The lacquer also produced well adherent coatings having the same mechanical and optical properties when applied to other substrates, such as foils of polyester, polyolefins, acrylic resin, polyurethane, but also on paper and glass, regardless of the specific method of applications.

EXAMPLE 2

A lacquer was prepared from the same ingredients as in Example 1 in the same manner, but in different proportions. It contained 30 parts of the acrylic copolymer of example 1, 9 parts polymethylmethacrylate, 9 parts hexamethoxymethyl melamine, 2.5 parts p-toluenesulfonic acid, 1.2 parts ammonium hydroxide solution, and 50 parts of the azeotropic aqueous alcohol.

It was applied to polyester foil by the photogravure machine mentioned in Example 1 and cured 40 seconds at 160° C. The coating adhered firmly to the foil, resisted scratching, was non-blocking and very glossy. Limited tests showed analogous results when the lacquer was applied to the other substrates mentioned in Example 1.

EXAMPLE 3

A lacquer was prepared as in Example 1, but the amount of acrylic copolymer was reduced to 35 parts, and the otherwise completed lacquer was further mixed with 0.5 part impalpable silicon dioxide powder and 6 parts of a commercial, aqueous dispersion of polyethylene wax.

When the lacquer was applied to any one of the substrates mentioned in Example 1 and cured 60 seconds at 150° C., the coating showed undiminished scratch resistance and absence of blocking. It was transparent with good matting effect.

While ethanol was preferred in the above Examples as the least toxic of the volatile alcohols, methanol, isopropanol, propanol, may be substituted without changing the properties of the coatings produced. Minor adjustments in curing times and temperatures will readily be made to adapt the method to available equipment.

What is claimed is:
1. A lacquer suitable for protecting the surface of plastic film against abrasion consisting essentially of:
   (a) 8 to 16 parts by weight of an acrylic polymer consisting essentially of repeating units selected from the group consisting of $C_2H_3COOR$ and $C_3H_6COOR$, R being hydrogen, methyl, or ethyl, at least 1% and not more than 20% of said R being hydrogen;
   (b) 2.5 to 10 parts by weight of methyl or ethyl ester of polymethacrylic acid;
   (c) 5 to 10 parts by weight of a water-soluble, thermosetting melamine resin; and
   (d) a volatile liquid medium consisting essentially of a mixture of water and an alkanol having up to three carbon atoms, said polymer, said ester, and said resin being uniformly dispersed in said medium.
2. A lacquer as set forth in claim 1, further comprising an amount of catalyst capable of accelerating the setting of said resin in the absence of said polymer and said ester at a temperature of approximately 150° C, said catalyst being a strong acid.
3. A lacquer as set forth in claim 2, wherein said catalyst consists of 1.2 to 2.5 parts by weight of p-toluenesulfonic acid.
4. A lacquer as set forth in claim 2, further comprising an amount of ammonia or an amine sufficient to make the pH of said lacquer 7.5 to 8.5.
5. A lacquer as set forth in claim 1, wherein said resin is hexamethoxymethyl melamine.
6. A lacquer as set forth in claim 1, wherein the amount of alkanol in said mixture is not less than 50% by weight.
7. A lacquer as set forth in claim 5, further comprising 1.2 to 3.5 parts p-toluenesulfonic acid, and an amount of ammonia or an amine sufficient to make the pH of said lacquer 7.5 to 8.5, said resin being hexamethoxymethyl melamine.
8. A method of protecting the surface of a plastic film against abrasion which comprises coating said surface with the lacquer set forth in claim 7, said medium being inert to said surface, and heating said lacquer until said medium is substantially completely volatilized and said polymer, said ester, and said resin jointly form a substantially transparent layer on said surface.
9. A method of protecting the surface of a plastic film against abrasion, which comprises coating said surface with the lacquer set forth in claim 1, said medium being inert to said surface, and heating said lacquer until said medium is substantially completely volatilized and said polymer, said ester, and said resin jointly form a substantially transparent layer on said surface.
10. A method as set forth in claim 9, wherein said lacquer is heated to a temperature of 140° to 160° C.

11. A lacquer as set forth in claim 1, further comprising at least one member of the group of matting agents consisting of silicon dioxide and polyolefines of lower molecular weight.

12. A lacquer as set forth in claim 6, wherein said alkanol is ethanol.

13. A method as set forth in claim 9, wherein said plastic film consists essentially of at least one member of the group consisting of polyvinyl chloride, polyester, polyolefin, acrylic resin, and polyurethane.

14. A method as set forth in claim 13, wherein the amount of alkanol in said mixture is at least 50% by weight.

* * * * *